June 24, 1930.  W. C. GRUNOW  1,768,474
BATTERY SUBSTITUTE
Filed Oct. 6, 1926  2 Sheets-Sheet 1
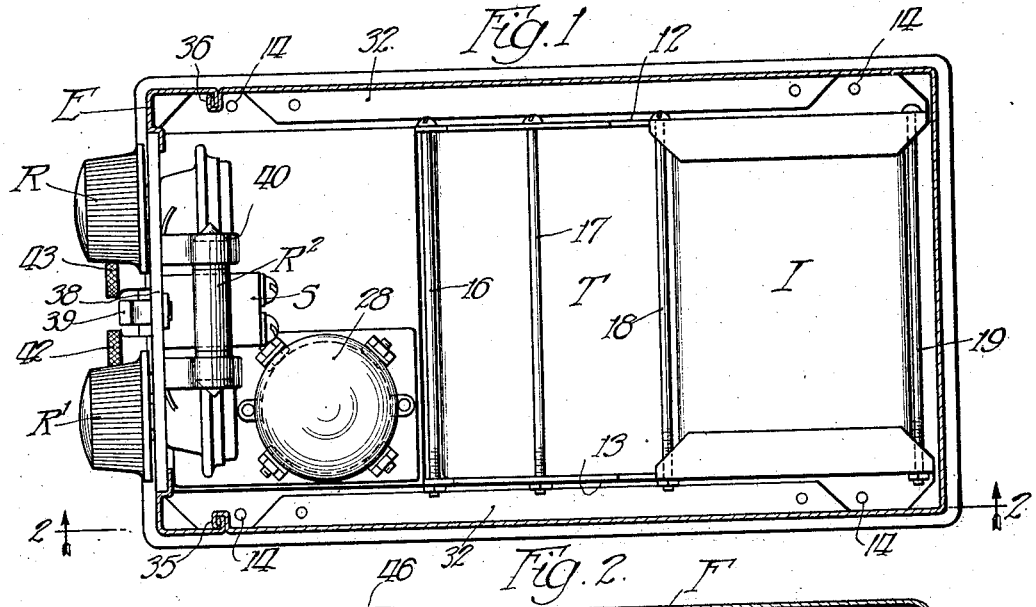
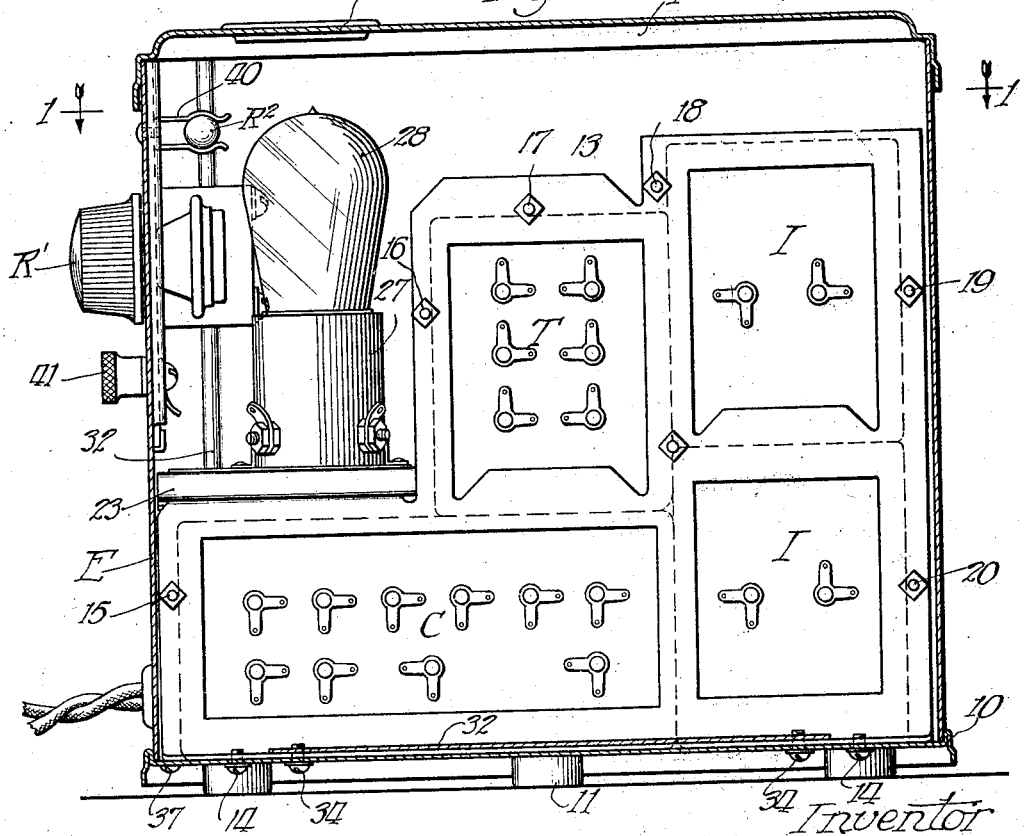
Inventor
William C. Grunow
George E. Mueller Atty.

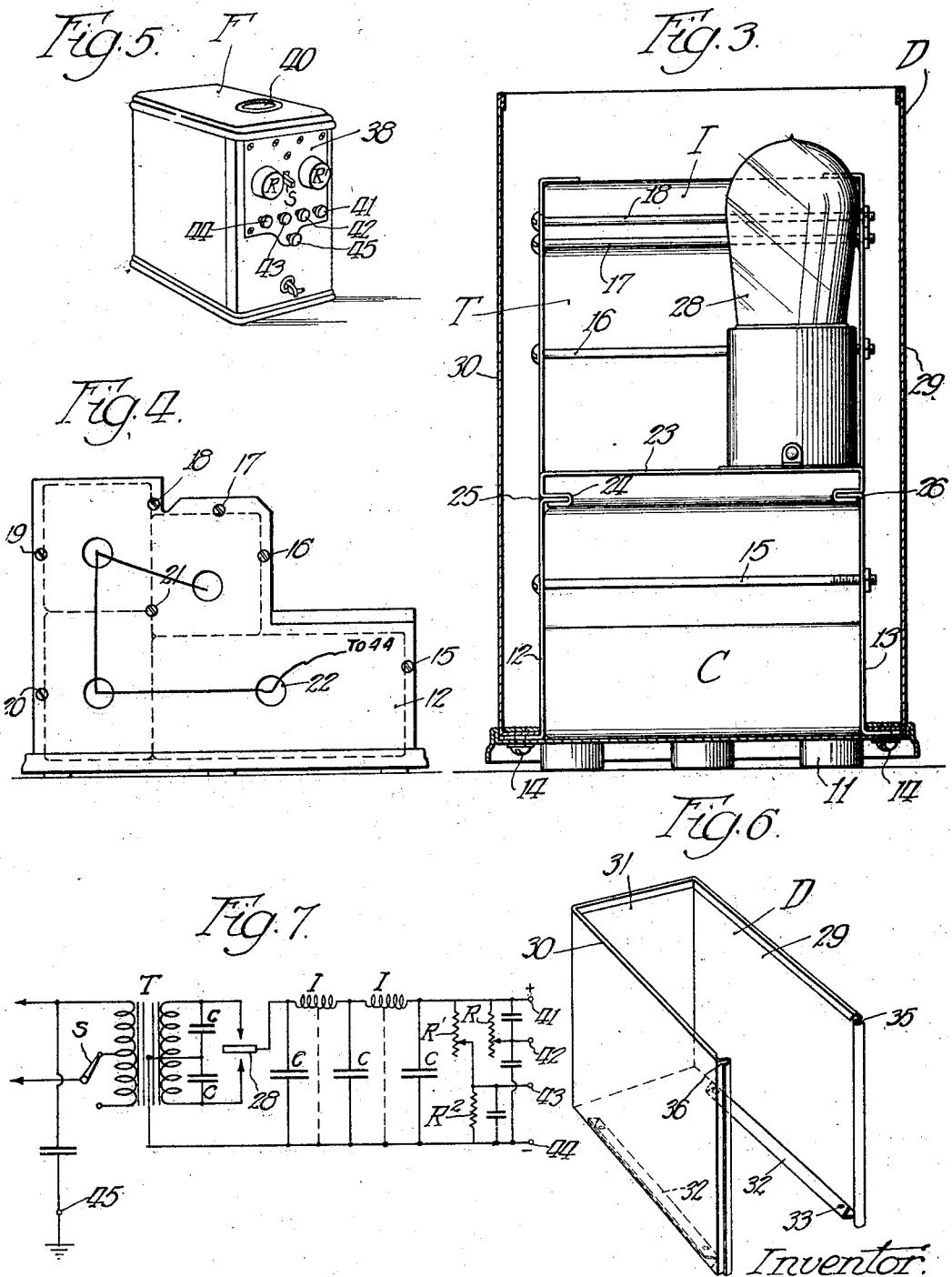

Patented June 24, 1930

1,768,474

UNITED STATES PATENT OFFICE

WILLIAM C. GRUNOW, OF CHICAGO, ILLINOIS, ASSIGNOR TO GRIGSBY-GRUNOW COMPANY, OF CHICAGO, ILLINOIS, A CORPORATION OF ILLINOIS

BATTERY SUBSTITUTE

Application filed October 6, 1926. Serial No. 139,789.

My invention relates to so-called battery eliminators or B current supply apparatus, an object being to provide an improved apparatus of the above character having certain features in construction and operation overcoming some of the defects and disadvantages of prior devices. More particularly, my apparatus is adapted for use as a B current supply for radio apparatus, although not limited thereto.

For a better understanding of my invention reference is to be had to the accompanying drawings, in which—

Fig. 1 is a cross sectional view along the line 1—1 of Fig. 2 looking down into the casing;

Fig. 2 is a vertical sectional view along the line 2—2 of Fig. 1 looking into the side of the casing;

Fig. 3 is a view looking into the left end of the casing of Fig. 1, with the outer casing shown in section;

Fig. 4 is a rear view of the apparatus supporting frame of Fig. 2 with the cover removed;

Fig. 5 is a perspective view of the device;

Fig. 6 is a perspective view of the side wall removed; and

Fig. 7 is a diagrammatic view of the circuit arrangement to which the apparatus illustrated is adapted.

Referring now more in detail to the device illustrated, it comprises a suitable base 10 formed up from sheet metal and having soft rubber studs 11 suitably secured to the base. Secured to the base 10 is a framework for supporting various elements of the apparatus so as to permit a ready removal or interchange of the same, and to this end I provide sheet metal side members 12—13 removably secured to the base preferably by screws 14. These side portions 12—13 of the supporting frame are adapted to clamp the various elements such as the condensers, inductance coils and transformer so that they may be readily inserted or removed for replacing. Thus a number of bolts 15 to 21, inclusive, are passed through the two sides of the frame with a nut on one end to draw the frame sides together. These bolts are so positioned as to permit ready removal of the elements and also effect proper clamping. It will be noted that the frame side 13 is so cut away, as indicated in Fig. 2, as to permit access to the terminals of the electrical units so as to wire the same. The frame side 12 has a number of openings 22 therein positioned opposite the apparatus units so that these may be connected in common and to one side of the line, preferably the negative side, as indicated in the circuit diagram.

As to the apparatus units held by the frame, for the particular circuit herein illustrated I provide a metallic casing C with a suitable number of condensers enclosed therein; inductance coils I and a transformer T.

Each of these elements C, T and I is enclosed within a metallic casing so as to be in the form of a single readily removable unit and built up with an insulating head and terminals mounted thereon which appear in the openings of the frame side for wiring. The method of constructing these elements is more particularly pointed out in my copending application filed of even date herewith, Serial Number 139,788.

The main frame sides are also arranged so as to receive a rectifying tube supporting base plate 23, this plate being formed as shown more particularly in Fig. 3, with channeled elements 24 adapted to slip over the inturned portions 25—26 of the frame sides 12—13. A suitable lamp socket 27 is insulatingly mounted upon this plate 23 and carries a rectifying tube 28, preferably a so-called Raytheon tube, although of course, my invention is not limited to this particular tube. Thus the plate 23 may have the lamp socket mounted thereon as a unit and be then applied to the frame or readily removed therefrom.

Referring now to the outer casing, this is made up in separable portions so that it may be readily removed to permit access to the elements held by the frame whereby they may be readily inspected or removed for replacement or other purposes. This outer casing includes the three wall portion D shown in perspective in Fig. 6, and which comprises the two side walls 29 and 30 and end wall 31. The two side walls have intermediately projecting portions at the bottom in the form of a turned back or folded over extension 32 having the tapped holes 33 therein in which fastening screws 34 are threaded through the base to hold the casing portion in place. The casing portion D sets down into the recessed or cupped base, fitting tight against the flange of the base so as to more securely and firmly hold the parts together. The side walls 29 and 30 of the casing D have their end portions 35—36 formed into a U-shape so that it will slide down over the inwardly projecting ends of the front wall portion of the casing as indicated in Fig. 1. This will more firmly hold the parts together.

As to this front wall portion E of the casing, this is separable from the portion D for various reasons, one of them being that it permits mounting portions of the apparatus including the control switches thereon so that the wiring may be left intact although the casing removed for access to the apparatus. This front wall E is also of sheet metal having a turned in portion at the bottom by which it is secured to the base by screws 37.

Suitable controlling apparatus is secured to this front wall E and in the present embodiment of my invention I have mounted thereon the resistors R and R' used for controlling the detector and intermediate plate voltage connections. Any suitable device of this character may be provided and I have shown a well kown form of variable resistor having the adjustable knobs or dials extending from the face of the wall with the resistor element secured to the rear face and thus inside of the casing. It is to be noted that I preferably mount this apparatus upon an insulating panel 38 which is set into a recessed portion of the wall E and suitably secured thereto. Also mounted upon this panel is a switch S, in this particular instance a two-position switch for varying the connections to the primary side of the transformer, as will be seen from the accompanying circuit. This switch S has a lever 39 having upper and lower positions for controlling the two-position switch. I also provide a fixed resistance R² which is held in spring clips 40 fastened to the rear face of the panel 38, said clips having suitable terminal connectors for wiring in this element.

A suitable number of binding posts are provided for the various terminals, depending upon the circuit employed, and I have shown five such posts 41 to 45.

A removable cover F is slipped down over the top of the casing and frictionally held in position. This cover has an opening 46 through which the rectifying tube 28 may be seen so that it may be inspected for operation.

In assembling the apparatus I preferably first secure the side walls 12—13 to the base 10 by the screws 34. This is preferably done before the clamping bolts are passed through the side walls. I now place the condenser C and impedance coils I in position and also slip the transformer T down into place so that they are all compactly held in place. I now pass the clamping bolts 15 to 21 through the frames and thread the nuts thereon, after which the bolts are drawn up so as to securely clamp the various elements therein.

The tube supporting shelf 23 with its tube socket 27 is now slipped onto the framework. The tube 28 of course need not be placed in position at this time, but it may be left out until the apparatus is all completely assembled and wired.

I now place the front panel E with its apparatus assembled thereon in position upon the base by securing it thereto with the screws 37 passed up through the base as indicated in Fig. 2.

All of the apparatus now being mounted in position it is wired according to the circuit arrangement employed.

In Fig. 7 I illustrate diagrammatically one form of circuit adapted for use with the apparatus here illustrated, and which circuit arrangement forms the subject matter of a copending application, Serial No. 139,788, filed by me of even date herewith. I have indicated the corresponding apparatus parts in this circuit diagram by reference characters as used in the other figures. The transformer T is shown as connected through the controlling switch S which is connected to the usual alternating current lighting circuit of 110 volts, the switch being adapted to cut in a different number of turns on the primary of the transformer so as to vary the input and thus the output. As shown, two connections are available so as to provide two output voltages for radio receiving sets of different numbers of tubes. I find that this two-way connection is sufficient to take care of the ordinary commercial sets now on the market. The various condensers indicated in the diagram are all enclosed in the casings C mounted at the bottom of the framework. The rectifying tube, which for the present circuit is the co-called Raytheon type, is indicated at 28 in the circuit drawing with the anodes of the tube connected to the secondary of the transformer and cathode connected through the inductance choke coils I to the plus terminal of the device. The secondary of the transformer has a central tap extending to the negative terminal of the device. It is to be noted that the cores of the various coils are also connected to the negative side of the apparatus, this being effected by connections made to the metal protective covers of the apparatus by soldering a common wire to these coverings or casings through the openings 22 of the frame side, as indicated in Fig. 4. This common connection is then extended onto the negative terminal. One incoming lead to the transformer is connected to the ground binding post. The variable resistance elements R and R' are adapted for varying the output of the device according to the use to which it is put or the set with which it is employed. The element R which controls the voltage from the plus or amplifier terminal 41 to the intermediate terminal 42, which is to be connected to the intermediate plate voltage terminal of the set, has a range of 500 ohms to 50,000 ohms. The voltage from between the detector terminal 43 and negative terminal 44 is variable through the resistance R', which has a range from 3,500 to 50,000 ohms but of course may be varied according to the output desired.

Thus with the apparatus all wired up according to the circuit employed, the parts or units are all readily available for inspection and replacement. Assuming that an inspection of the apparatus is desired in order to locate some fault, for instance, the cover F is removed and thereafter the U-shaped casing D lifted off of the device after the holding screws 14 are removed. Thus the apparatus is exposed from the top and three sides and may be readily inspected and tested. Assuming that one of the coils as I, for instance, is to be removed, it is only necessary to remove the clamping bolt 19 and loosen the clamping frame sides. The wiring is then unsoldered from the terminals and the element may be readily slipped out and another one put into place and rewired. The same is true of any of the other elements. For instance, the condenser unit C may be removed for replacement or inspection by removing the proper clamping bolts and unsoldering the connections to the terminals. This unit may then be removed by first pulling out the lower coil I, or it may be removed by taking off the face panel E and pulling the condenser unit out of the frame at that end. Likewise the transformer T may be readily lifted up out of the frame by removing clamping bolt 17.

It will thus be seen that access may be readily had to all of the apparatus units of the device and they may be tested or readily removed for inspection and replacement.

What I claim as new and desire to secure by United States Letters Patent is:—

1. In a current supply device of the character described, a suitable base, a plurality of condenser and coil elements suitably enclosed as individual units, and a frame work for holding said units upon said base and including means for independently removably securing the units thereby, said frame including two vertically disposed side walls between which said units are clamped, one of said side walls being readily removable to permit ready removal of any of said units.

2. In a current supply device of the character described, a suitable base, a plurality of condenser and coil elements suitably enclosed as individual units and each having terminal connectors upon one face thereof, and a frame work for holding said units upon said base, said frame including two vertically disposed side walls between which said units are independently removably clamped and one of which walls is a skeleton frame through the openings of which the unit terminals are exposed for cross wiring.

3. In a current supply device of the character described, a suitable base, a plurality of condenser and coil units, a frame comprising a pair of sheet metal vertically disposed walls each of an L shape between which said units are independently removably clamped, a rectifying tube carrying shelf removably carried by said frame sides in the angular recess thereof, and a tube socket mounted upon said shelf and positioned so as to permit placing a tube in said angular recess.

In witness whereof, I hereunto subscribe my name this 11th day of September, 1926.

WILLIAM C. GRUNOW.